United States Patent

[11] 3,616,369

[72] Inventor Thomas F. Williams
 Knoxville, Tenn.
[21] Appl. No. 687,410
[22] Filed Nov. 9, 1967
[45] Patented Oct. 26, 1971
[73] Assignee The United States of America as
 represented by the United States Atomic
 Energy Commission
 Continuation-in-part of application Ser. No.
 324,146, Nov. 15, 1963, now abandoned.

[54] RADIATION-INDUCED IONIC POLYMERIZATION CONTROLLED BY THE PRESENCE OF LEWIS ACIDS OR LEWIS BASES
 2 Claims, 3 Drawing Figs.

[52] U.S. Cl. ..................................................204/159.22,
 204/159.23, 204/159.24, 260/80 P
[51] Int. Cl. ........................................................ B01j 1/00,
 C08d 1/00, B01f 11/00
[50] Field of Search............................................ 204/159.22

[56] References Cited
 UNITED STATES PATENTS
 2,903,404 9/1959 Oita et al. ...................... 204/159.24
 2,924,561 2/1960 Schmerling................... 204/159.24
 2,943,987 7/1960 Anderson...................... 204/159.24
 FOREIGN PATENTS
 1,337,235 8/1963 France

OTHER REFERENCES

Bonin et al., Effect of Ammonia on the Radiation Induced Polymerization of Cyclopentadiene at −78°, Jrn. a/The American Chemical Society, Vol. 84, p. 4355 (11-20-68).

*Primary Examiner*—Murray Tillman
*Assistant Examiner*—Richard B. Turer
*Attorney*—Roland A. Anderson ABSTRACT: This invention relates to a method for controlling the molecular weight of a polymer derived from an ethylenically unsaturated monomer which can be catalyzed to polymerize by a Lewis acid, which comprises mixing said monomer with a Lewis base soluble in said monomer, and then reacting the mixture with an amount of high-energy radiation at least sufficient to initate and propagate polymerization of said monomer, said Lewis base being selected from the class which functions to determine the molecular weight of the polymer produced at a given radiation dosage and temperature, said monomer being selected from an ethylenically unsaturated monomer having electron-releasing groups attached directly or indirectly to the ethylenic linkage of said monomer which impart a Lewis base character to said monomer.

The invention is also applicable to controlling the molecular weight of a polymer derived from a monomer which can be catalyzed by a Lewis base. In that case, the molecular weight of the final polymer can be controlled by mixing the monomer with a Lewis acid and then irradiating the mixture at a given temperature and to a given radiation dosage.

INVENTOR.
Thomas F. Williams
BY
ATTORNEY.

RADIATION-INDUCED IONIC POLYMERIZATION CONTROLLED BY THE PRESENCE OF LEWIS ACIDS OR LEWIS BASES

This application is a continuation-in-part of my copending application, Ser. No. 324,146, filed Nov. 15, 1963 and now abandoned.

The invention described herein was made in the course of, or under, a contract with the U.S. Atomic Energy Commission.

BACKGROUND OF THE INVENTION

The present invention relates to an improved radiation-induced cationic polymerization process. More specifically, it relates to an improved way of utilizing radiation to control the extent (i.e., the molecular weight) or polymerization of a class of monomers which are known to be initiated or catalyzed by Lewis acids including Friedel Crafts catalysts.

It is known that a selected class of polymerizable monomers can be polymerized by Lewis acid chemical catalysts. The Friedel Crafts type of Lewis acid catalyst is especially useful for this purpose. Among the catalysts which are know to be useful for this purpose are included $BF_3$, $AlCl_3$, $AlI_3$, $UCl_4$, $TiCl_4$, $Z\&CL_4$ and other metal halides; $BF_3$ etherate; hydrogen acids such as $H_2SO_4$, HF, HCl and HBr. The polymerization process which proceeds by virtue of the Lewis acid-catalyzed reaction of selected polymerizable monomers is known as cationic polymerization.

In general, cationic polymerizations are characterized by an extremely rapid rate of polymerization at extremely low (i.e., sub zero) temperature conditions with the efficiency (meaning conversion per unit weight of catalyst) of polymerization decreasing with increasing temperature owing to competitive side reactions. Cationic polymerizations are to be contrasted with free radical polymerization reactions which are known to be inhibited by molecular oxygen or by small concentrations of phenols or aromatic amines or other free radical scavengers. Cationic polymerizations are not affected in the same manner by these reagents. Another distinguishing feature of chemically catalyzed cationic polymerizations is that they often require heterogeneous catalyst systems, that is to say where the catalyst is of limited solubility in the polymerizable monomer so that the extent of polymerization, i.e., the molecular weight of the polymer formed is rather independent of the initiator or catalyst concentration. A disadvantageous characteristic of cationic polymerization using chemical catalysts to induce polymerization is that they are extremely sensitive, difficult to control, and therefore difficult to conduct in a reproducible manner.

SUMMARY OF THE INVENTION

It is accordingly an object of this invention to provide an increased measure of control of the polymerization of monomers which are known to be initiated and/or catalyzed by conventional Lewis acids. Another object of this invention is to provide an improved process for conducting ionic (including cationic and anionic) polymerizations. Another object is to provide a radiation-induced cationic polymerization process. As used herein the term polymerization includes homopolymerization as well as copolymerization.

As a radiation-induced cationic polymerization process the objects of this invention are effected by irradiating a mixture of a Lewis base and a monomer, known to be polymerizable by a Lewis acid catalyst, with at least sufficient radiant energy to initiate and propagate polymerization of said monomer. The irradiation may be accomplished by X- or gamma rays, beta rays, high-energy electrons, accelerated ions, neutrons and the like. Radiation from the relatively long-lived radioactive fission products frequently provides a convenient beta and gamma source, provided the source in all cases is properly calibrated.

RADIATION-INDUCED CATIONIC POLYMERIZATION

Figure 1:
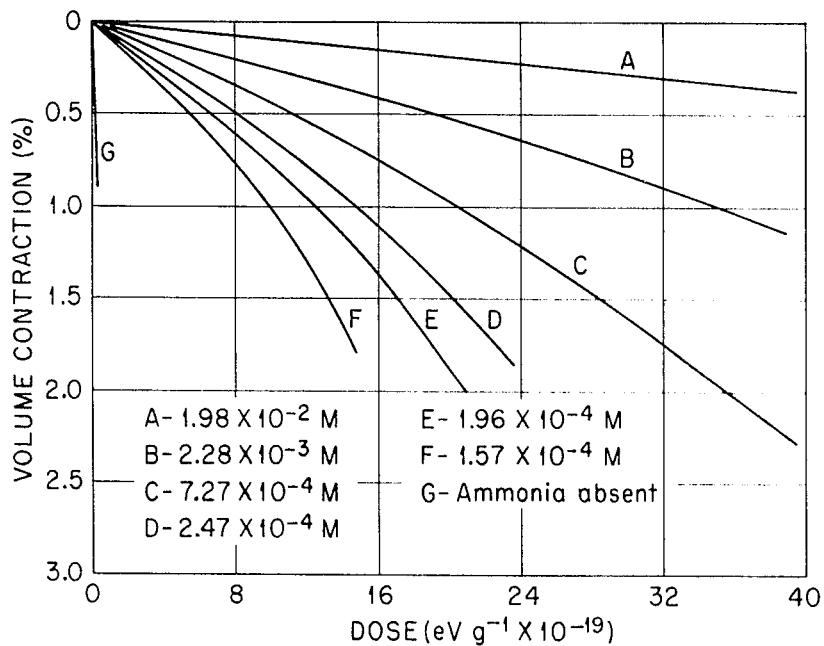
FIG. 1 shows the effect of varying amounts of ammonia on the conversion of cyclopentadiene polymer by irradiating mixtures of said monomer and ammonia.

The class of suitable monomers for carrying out this invention, (in addition to being initiated to polymerize by Lewis acids, particularly of the Friedel Crafts type), are characterized in that they are ethylenically unsaturated structures bearing electron-releasing groups attached directly or indirectly to the carbon atoms of the ethylenic linkage. By a Lewis acid or base, I mean to refer to the acid-base system as propounded by G. N. Lewis and as explained in Luder, W. F. and Zuffanti, "The Electronic Theory of Acids and Bases," 1-106, John Wiley & Sons, Inc., 1946. With reference to this invention, a Lewis base is a reagent which possesses unshared electron pairs in its molecule and hence will be interacted with electron deficient sites of a contacting molecule —in this case the positive ions of at least some of the irradiated monomer molecules having electron deficient sites. Among the Lewis bases which are operable for the purpose of controlling a radiation-induced cationic polymerization are: ammonia, lower alkyl amines such as methyl amine, dimethyl amine, trimethyl amine; piperazine, piperidine, N-alkyl piperidines, pyridines, pyrroles, straight chain and branched chain alkyl amines containing up to 18 carbon atoms; hexamethylene diamine, ethylene, diamine, N, N dimethyl formamide, hydroxylamine, hydrazine, guanidine; lower alkyl liquid alcohols such as ethyl alcohol, n-butanol; lower alkyl ethers; tetrohydrofurans and phosphines.

A radiation-induced cationic polymerization is similar to a chemically catalyzed cationic polymerization in that it is applied to monomers having a Lewis base character, that is monomers which have electron-rich sites. In order to induce formation of electron-rich sites on the monomer, or stated another way, in order to induce a

structure to function as a Lewis base, electron-releasing groups should be attached directly or linked indirectly to the carbon atoms of the ethylenic bond. Among some of the more common electron releasing groups which can be used to promote a radiation-induced cationic reaction are:

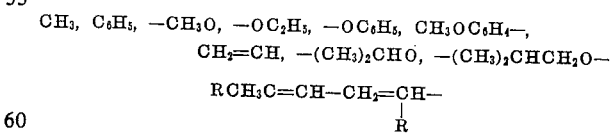

alpha or beta naphthyl, and anthracyl. In general, the ortho-para directing substituents in benzene rings, when attached directly or indirectly to the carbon atoms of the

bond, will impart a Lewis base character to the ethylenic structure.

Typical monomers known to be polymerized by way of $CH_{10} C(OR)_2$ cationic polymerization process in that such monomers are initiated to polymerize by Lewis acids or Friedel Crafts reagents and which therefore are useful in the method of this invention are isobutylene, alkyl vinyl ethers $CH_2 = CHOR$ where R is a straight or branched chain having up to 18 carbon atoms, such as isopropyl vinyl ether, and isobutyl vinyl ether and octadecyl vinyl ether, styrene, butyl vinyl ether, p-methoxy styrene, p-dimethylamino styrene, alpha-substituted styrenes, such as alpha methyl styrene, beta pinene, 1-3 butadiene, n-vinyl carbazole, vinylidene ethers $CH=C(OR)_2$ where $R = CH_3$, $C_2H_5$, $n-C_3H_7$, iso $C_3H_9$, vinyl naphthalenes, vinyl pyridines, 2-vinyl dibenzylfuran, cyclopentadiene, terpenes, myrcene and unsaturated hydrocarbons derived from cracking petroleum wherein each of said monomers have electron-releasing substituents such as to render the

electronegative or basic in the Lewis base sense. Polymerizable monomers having a 1, 2 or alpha-beta-substituted structure will also proceed by a radiation-induced cationic polymerization. Among monomers of this kind are those with an indene, acenaphthylene, coumarone structure; 1, 1 diphenylethylene, 1, 2 dimethoxyethylene and anethole.

By means of my discovery that ionizing radiation can effect polymerization of the hereinbefore designated class of monomers, it is now possible to control the molecular weight of the final polymer. Thus, by my invention, one may produce a host of products from a single monomer having a discrete range of molecular weights in a manner heretofore not thought possible by conducting polymerization of the selected class of monomers through the use of Lewis acid chemical catalysis.

In order to practice this invention, a monomer of the defined class is mixed with a Lewis base and the resultant mixture exposed to at least sufficient radiation, as measured in electron volts per gram (or rads) of monomer, to initiate and propagate polymerization. The determination of the amount of absorbed energy necessary to induce a definite amount of polymerization of a given monomer of the defined class is a matter of routine skill within the art and varies with the monomer under consideration. Further amounts of radiation will in the presence of, or absence of, the Lewis base, merely result in an increased degree of conversion. That is, it will result merely in an increase in the amount of monomer converted to a given polymer. However, in the case where the Lewis base is used in a mixture with the monomer, the molecular weight of the resultant polymer will be found to be a function of the concentration of the Lewis base in the preirradiated mixture. Regardless of the degree of conversion of the monomer, the degree of polymerization (i.e., the molecular weight of the resultant polymer) will remain essentially the same. Thus, any additional energy absorption by the monomer will only result in polymerization of additional monomeric units to greater yields of a polymer within a rather discrete range of molecular weight.

In general, the kinetics of cationic polymerization initiated by Lewis acid catalysis are most efficient at low, i.e., subzero, temperatures. In some cases, the full extent of polymerization to yield a high molecular weight polymer takes place virtually instantaneously. Products of lower molecular weight are possible to achieve by conducting the polymerization at higher temperatures, but the reproducibility and control of the reaction is then difficult to maintain. By contrast, the method of this invention permits operation of ionic (cationic as well as anionic) polymerization at temperatures where the polymerization kinetics are rapid, but at conditions under which the degree or extent of polymerization may be controlled within discrete and operable limits.

It should be noted that the discrete control achieved by the presence of a Lewis base in admixture with an irradiated monomer of the defined class has no parallel in the Lewis acid chemically catalyzed cationic polymerization. Thus, addition of a Lewis base to a Lewis acid-catalyzed cationic polymerization would simply neutralize the Lewis acid and thus hinder, if not totally impede, the polymerization reaction.

The mechanism connected with the radiation-induced ionic polymerization of this invention is not thoroughly understood. Apparently, the energy absorbed from the impinging radiation creates cationic species out of at least a portion of the irradiated monomeric units. These cationic species are thought to initiate and propagate the resultant polymerization in a manner similar to Lewis acid-catalyzed cationic polymerization. That these initiating and propagating species are cationic in character is shown by the fact that the extent of polymerization depends on the concentration of the added Lewis base reagent, thus making it reasonable to assume that the increased measure of control made possible by this invention is a neutralization reaction. Further evidence of the ionic character of these radiation-induced reactions is provided by the fact that they are essentially unaffected by the presence of free radical-inhibiting reagents.

The control which this invention permits is both unique and surprising for it is generally known that acid-base neutralizations are extremely rapid. On this basis, one would expect that polymerization would be pretermitted by the Lewis acid-base neutralization. Apparently, however, the time required for polymerization of the monomer molecule is shorter than the kinetics involved in the neutralization of the positively charged sites on the initiating monomeric units, thus permitting polymerization in the face of a competing neutralization reaction.

Having described the essential elements and scope of my invention in general terms, the following example, in its several aspects, will further define the scope of this invention and illustrate its unique operation as a radiation-induced preparative technique applied to a typical monomer.

EXAMPLE I

Cyclopentadiene monomer is known to be easily polymerized to a high molecular weight polymeric product by a Lewis acid-catalyzed reaction. See for example, Wilson and Wells, Chemical Reviews, 34, 1, 1944. I have shown that a cyclopentadiene monomer can be polymerized by ionizing radiation, particularly gamma radiation, such as from a cobalt-60 source. The radiation-induced polymerization product is similar to the product produced by a Lewis acid catalyst. As is the case with polymerization by the Lewis acid catalyst route, radiation-induced catalysis of monomers of the selected class, including cyclopentadiene, could not be conveniently controlled (at least prior to this invention) to produce a polymer having a discrete range of molecular weight.

A sample of dicyclopentadiene dimer was thermally cracked to the monomer by boiling in a still-pot under a stream of nitrogen. The monomer was then passed down a column of activated silica gel into a receiving flask. The monomer was then degassed at a temperature of $-78°$ C. With the purified cyclopentadiene monomer now held at $-78°$ C. a major portion was distilled into another receiving flask maintained at $-196°$ C. the residue being rejected. The purified cyclopentadiene was then distilled into radiation vessels as needed.

The following experiments were conducted with the thus purified cyclopentadiene. All irradiations of cyclopentadiene were carried out at $-78°$ C. at calibrated positions relative to a cobalt-60 gamma source at a dose rate of about $3\times10^4$ rads/min. All dose rate values are based on the use of the Fricke dosimeter according to the absolute calibration of Hochanadel and Ghormley as described by them in "The Journal of Chemical Physics," 1953, 21, 880.

1. A portion of the purified cyclopentadiene was transferred into an irradiation vessel and exposed to the cobalt-60 gamma source up to varying total dosages. Irradiation beyond a total dose of $6.0\times10^7$ ev./grams, corresponding to a 2 percent conversion to polymer (in terms of percent monomer converted), resulted in the formation of a polymeric gel. It was found that cyclopentadiene monomer polymerized with high yield as evidenced by a G($-C_5H_6$) value of about 25,000 where G($-C_5H_6$) designates the total number of monomer molecules of cyclopentadiene which disappear per 100 electron volts of absorbed energy. It was found that the yield of cyclopentadiene monomer was linear with irradiation dose up to 20 percent conversion, and at doses exceeding 5.0 ×$10^{19}$ ev./g. (i.e., about one megarad), the pure monomer is converted to a firm rubber, impervious to organic reagents which serve as a solvent for the starting monomer. A total dosage of 1×$10^{18}$ ev./gram resulted in 3.4 percent conversion to polymer; a total dosage of 5×$10^{18}$ ev./gram resulted in 15.2 percent conversion to polymer and a total dosage of 10×$10^{18}$ ev./gram resulted in 25.5 percent conversion.

2. A 5×$10^{13}$ M solution of the stable free radical 2,2diphenyl-1 picryl hydrazyl (DPPH) in cyclopentadiene was irradiated to varying total dosages. An average G(—monomer) value of 8,400 was calculated from several runs.

3. Cyclopentadiene samples containing added oxygen (1.7×$10^{13}$ moles $0_2$ per liter of cyclopentadiene) were irradiated as in (2) and yield an average G(—monomer) value of about 5,300. These yields obtained in the presence of DPPH and oxygen are less than those obtained for irradiation of the pure additive-free monomer by a factor of about 3–4 indicating that radiation-induced polymerization of cyclopentadiene is very little inhibited by these conventional free radical scavengers.

4. In contrast to (2) and (3) I have irradiated numerous samples of cyclopentadiene containing varying amounts of Lewis bases such as ammonia, methyl amine, dimethyl amine, and trimethyl amine, and, at comparable concentrations of Lewis base, the G(-monomer) value is lower by several orders of magnitude to values varying from 200–500. These results indicate the strong effect of the Lewis base additive and points up that the observed polymerization involves an ionic mechanism rather than a free radical mechanism.

It should be pointed out that the selection of monomer to be used in the present invention depends not only on its structure in accordance with guidelines heretofore disclosed, and on the fact that such monomer is selected from those monomers which are polymerized by the conventional chemical catalysts mentioned, but also depends on the temperature of polymerization. Thus, the radiation-induced polymerization of some monomers will proceed by way of a free radical mechanism at one temperature as evidenced by an extremely low G(—monomer) value in the presence of conventional free radical scavengers; whereas at another (usually lower) temperature, the same monomer will polymerize to yield an extremely higher (at least by a single order of magnitude) G(—monomer) value, indicating that it polymerized by an ionic process. Therefore, in selecting the monomer for the process of this invention, the temperature of polymerization should be considered an important factor. Moreover, it shows that despite the fact that a monomer will polymerize by way of a free radical path under one set of conditions, it does not rule out its use in a radiation-induced ionic polymerization as herein described under different conditions.

5. Measurements over the dose range 2.70×$10^{16}$ ev./gram/ min. to 2.83×$10^{17}$ ev./gram/min. indicate that the radiation-induced cationic polymerization is proportional to (dose rate)$^{0.9}$.

6. Radiation-induced cationic polymerization may be conducted with solutions of the monomer in organic solvents such as hexane. Solutions of cyclopentadiene in n-hexane are easily polymerized by radiation to give G(—monomer) values of 9,840 for a 25 mole percent cyclopentadiene solution and 4,920 for a 75 mole percent solution; these solutions being comparable to that obtained for the radiation-induced polymerization of the pure monomer at the same dosage of radiation. In general, radiation-induced cationic polymerization may be carried out with solutions of the monomer where the solvent is neutral; that is, where the solvent is not categorized either as a Lewis base or acid such as saturated or chlorinated hydrocarbons.

7. Samples of the purified monomer were transferred to several irradiation vessels, each containing a different concentration of ammonia admixed with the monomer. These samples were irradiated in the same manner to the same total dosage 1×$10^{20}$ ev./g. The effect of ammonia on the degree of conversion is illustrated by the data in table I below.

TABLE I

| Ammonia Concentration (in moles/liter) | Conversion to Polymer in wt. percent | G($-C_5H_6$) molecules/100 e.v. |
|---|---|---|
| 1.57×$10^{14}$ | 5.86 | 533 |
| 1.96×$10^{14}$ | 4.2 | 382 |
| 2.47×$10^{14}$ | 3.68 | 335 |
| 7.27×$10^{14}$ | 2.61 | 238 |
| 22.8×$10^{14}$ | 1.52 | 140 |
| 200×$10^4$ | 0.57 | 50 |

Although these G(—monomer) values obtained in the presence of ammonia are less than in the case of the pure monomer, nevertheless these values are comparable to (and in some instances greater) than those obtained for butadiene, a monomer known to polymerize to high yields by radiation.

The effect of ammonia concentration on the extent of monomer conversion may be seen from the curves of FIG. 1. In FIG. 1, the abscissa parameter is radiation dosage plotted in terms of the total amount of radiation energy absorbed by the irradiated monomer; the ordinate is plotted in terms of percent volume contraction of the liquid monomer wherein a 1 percent volume contraction of the liquid monomer corresponds to about a 5.7 volume percent of polymer produced. It will be seen that for low initial ammonia concentrations, the curvature increases sharply with progressive irradiation dose indicating that the ammonia may be incorporated in the polymer molecule. By contrast, the contraction curve for pure cyclopentadiene remains essentially linear with dose over the short interval to the gel point. The volume contraction is linearly proportional to the polymer yield (which in this case is 5.7 percent polymer per 1 percent volume contraction of monomer liquid) as determined by direct weighing of the polymer remaining after removal of the monomer by distillation—this proportionality factor applied to runs carried out in the presence and absence of ammonia, the Lewis base additive used in this experiment.

8. The molecular weight of the polymer isolated from the ammonia runs depends upon the irradiation dosage and the amount of ammonia added. At high ammonia concentrations and low conversions (1 percent or less) the polymer is a waxy resin, soluble in organic solvents. On the other hand, a cyclopentadiene solution containing an extremely low (i.e. 2×$10^{-5}$ mole fraction) of ammonia yields a gellike polymer after the sample is irradiated to a dose of 2.0×$10^{-20}$ electron volts/gram (3.2 megarads), a dosage corresponding to 12.2 percent conversion. The potency of ammonia in controlling the molecular weight of the final polymer is shown by the data in table II below.

TABLE II

| Ammonia Concentration | $M_r$ Molecular Weight* |
|---|---|
| 2.5×$10^{13}$M | 17,800 |
| 1.79×$10^{13}$M | 30,900 |
| 1.29×$10^{13}$M | 40,500 |
| 7.5×$10^4$ | 47,000 |
| 2.5×$10^4$ | 107,000 |
| 2.3×$10^4$ | 151,000 |
| no ammonia | >580,000 |

*$M_r$ was determined from measurements of intrinsic viscosity.

It will be seen that there is a definite correlation between the molecular weight of the polymer and the concentration of the added ammonia base at a given total radiation dose. The molecular efficiency of other Lewis base additives used to control the molecular weight of irradiated polymer at a given radiation dosage will vary according to basicity of the monomer being irradiated relative to the basicity of the Lewis base additive.

9. The preceding experiment (8) has shown the effect of varying concentrations of ammonia on the molecular weight of polymer products at the same applied radiation dosage. However, ammonia, as previously described, is not the only example of a Lewis base which may be used to control the molecular weight of the irradiated polymer. The organic amines can be utilized to produce parallel results.

Figure 2:
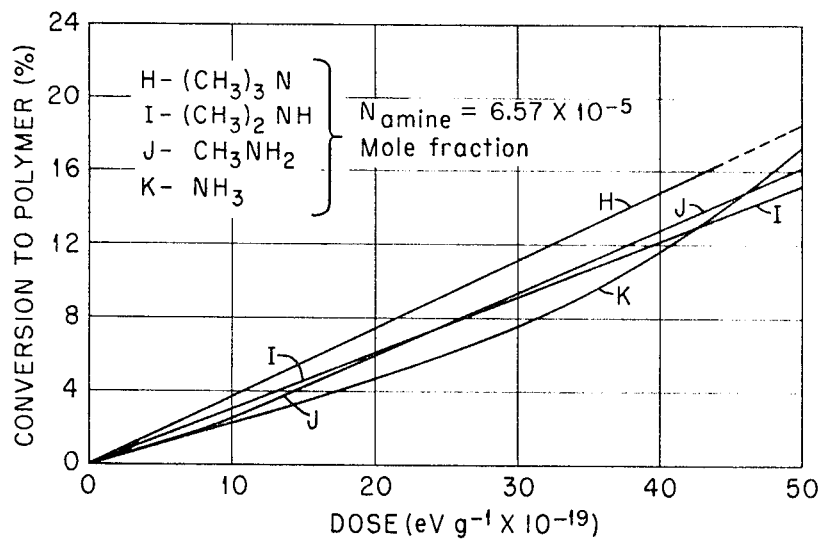
FIG. 2 compares the effect of ammonia with other Lewis bases (i.e., methyl amines) on the conversion of monomer to polymer.

10. FIG. 2 depicts the effect of comparable concentrations of ammonia and a primary, secondary, and tertiary amine of polymer yield, i.e., on the extent of conversion to polymer, where each point on the various curves represents a gravimetric determination on a separate irradiated sample. It will be seen that comparable amounts of polymer are produced by the addition of ammonia, methylamine, dimethylamine or trimethylamine at the same concentration.

It will be seen that there has been described a radiation-induced cationic polymerization process in which the final molecular weight can be controlled within fairly discrete limits simply by including a Lewis base with the selected monomer to be irradiated.

RADIATION-INDUCED ANIONIC POLYMERIZATION

The process of this invention is also applicable to control molecular weights of polymers by radiation-induced anionic polymerization of selected monomers. In such cases the choice of monomer should be such that at least a portion of the irradiated monomer molecules will be converted to an anionic species by radiation to initiate and propagate the polymerization of the monomer, the existence of said anionic species being evident by the fact that the addition of a Lewis acid will control the molecular weight of the polymer as a function of the Lewis acid additive.

A radiation-induced anionic polymerization is similar to a chemically catalyzed anionic polymerization in that it is applied to monomers having a Lewis acid character—that is, monomer having electron deficient sites at the ethylenic linkage. Among some of the known electron-attracting groups which can be used to provide a radiation-induced anionic reaction in order to induce

structure to function as a Lewis acid are $-CN$, $CONH_2$, $NO_2$, $COOR$ where R is an alkyl group, said groups being attached directly or indirectly to the carbon atoms of the ethylenic linkage. Typical monomers suitable for conducting a radiation-induced anionic polymerization are acrylonitrile, methacrylonitrile, vinylidene cyanide, acrylamide, 1,3-butadiene and substituted dienes such as isoprene, 1,2 and 1,4 dihydronaphthalenes, styrene- 1-chloro-1nitrothylene, nitroethylene, 2-nitropropylene, methyl methacrylate, methyl acrylate, ethyl acrylate, and n-butyl acrylate. Among the Lewis acids which are operable for the purpose of controlling molecular weight of polymer in a radiation-induced anionic polymerization are hydrogen acids including hydrogen bromide, hydrogen chloride, carbon dioxide, alcohols $R-OH$, glycols, amides, protonic solvents, alkyl or aryl derivatives of boron such as triethylboron or triphenylboron which possess electron deficient centers.

EXAMPLE II

This example is designed to illustrate a representative case of radiation-induced anionic polymerization. The example is more fully described in Transactions of the Faraday Society, 63, 376 (1967). In this example, nitroethylene represents a monomer known to be catalyzed by a Lewis base to polymerize in a nonirradiated induced polymerization. The nitro group creates a cation deficiency at the ethylenic linkage.

Nitroethylene was distilled under reduced pressures. A middle portion boiling between 38°–39° C. at 80 mm. Hg was collected and extensively dried. After drying over Drierite, the monomer transferred on to barium oxide at 350° C. in vacuum for several hours and then stored for 24 hours during which time slight polymerization occurred. After this storage, the remaining monomer was distilled in vacuum and condensed into several dilatometer bulbs. Varying amounts of hydrogen bromide (from $0-10^{12}M$ HBr) were then added to the bulbs after which they were irradiated at room temperature (10° C.) by gamma rays from a 1,000 curie cobalt-60 irradiation source. The polymerization was followed by a dilatometric method.

After irradiation, the polymer was precipitated by pouring into an acidified water-methanol mixture. The polymer was isolated by filtering and then washed successively with water, ethyl alcohol, and ether before drying to constant weight in vacuum at room temperature. The molecular weight of the polymer from each of the bulbs was then measured by intrinsic viscosity measurements.

Figure 3:
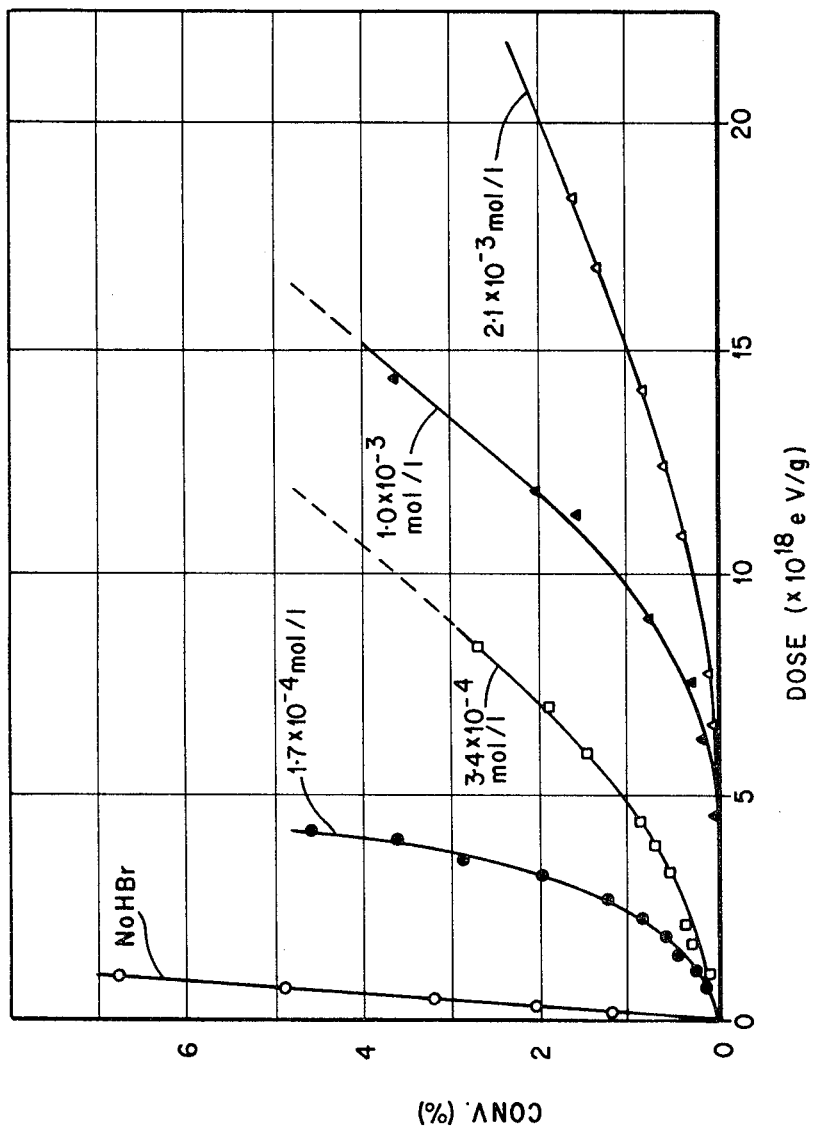
FIG. 3 depicts the effect of HBr on the conversion of nitroethylene by irradiating mixtures of nitroethylene with varying amounts of HBr.

The effects of HBr on the degree of conversion of nitroethylene to polymer is shown in FIG. 3. Whereas the conversion is virtually asymptotic for the monomer alone, the addition of HBr shows an inhibition on the amount of conversion followed by a marked increase in rate of conversion on continued radiation.

The potency of HBr in controlling molecular weight of nitroethylene polymer is shown in table III below.

TABLE III

| Hydrogen Bromide Concentration moles/liter | Molecular Weight |
| --- | --- |
| 0 | $8.03 \times 10^5$ |
| $3.1 \times 10^{15}$ | $6.42 \times 10^5$ |
| $3.4 \times 10^{14}$ | $4.23 \times 10^5$ |
| $1.7 \times 10^{14}$ | $2.12 \times 10^5$ |
| $2.1 \times 10^{13}$ | $1.24 \times 10^5$ |

It will be seen that the molecular weight was by a factor of nearly 8 in irradiating the mixtures of nitroethylene with varying amounts of HBr.

What is claimed is:

1. A method for controlling the molecular weight of a polymer produced by high-energy radiation of an ethylenically unsaturated monomer which comprises:

a. forming from one to a series of mixtures of an ethylenically unsaturated monomer having at least one electron-releasing group selected from the group consisting of $CH_3$, $C_6H_5$, $-CH_3O$, $-OC_2H_5$, $-OC_6H_5$, $CH_3OC_6H_4-$, $CH_2=CH$, $-(CH_3)_2CHO$, $-(CH_3)_2CHCH_2O-$,

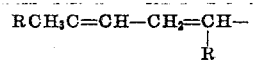

where R may represent $CH_3$, or $C_6H_5$, alpha or beta naphthyl, and anthracyl, attached to the ethylenic linkage of said monomer and b. A Lewis base, soluble in said monomer, at a molecular weight determining concentration, said Lewis base being selected from the group consisting of ammonia, lower alkyl amines, piperazine, piperidine, N-alkyl piperidines, pyridines, pyrroles, straight chain and branched chain alkyl amines containing up to 18 carbon atoms; hexamethylene diamine, ethylene, diamine, N, N dimethyl formamide, hydroxylamine, hydrazine, guanidine; lower alkyl liquid alcohols, lower alkyl ethers; tetrohydrofurans and phosphines, irradiating each mixture with high-energy radiation to a given radiation dosage and temperature, and then separating a polymer from each irradiated mixture, wherein the molecular weight of each of the separated polymers is a function of the Lewis base concentration in each of said mixtures.

2. A method for controlling the molecular weight of a polymer produced by high-energy radiation of an ethylenically unsaturated monomer which comprises:

a. forming from one to a series of mixtures of an ethylenically unsaturated monomer having at least one electron attracting group selected from the group consisting of — $CN$, $CONH_2$, $NO_2$, and $COOR$ where R is an alkyl group, attached to the ethylenic linkage of said monomer, and b. a Lewis acid, soluble in said monomer, at a molecular weight-determining concentration, said acid being selected from the group consisting of hydrogen bromide, hydrogen chloride, carbon dioxide, organic alcohols, glycols, amides, protonic solvents, and alkyl or aryl derivatives of boron which possess electron-deficient centers, irradiating each mixture with high-energy radiation to a given radiation dosage and temperature, and then separating a polymer from each irradiated mixture, wherein the molecular weight of the separated polymer is a function of the Lewis acid concentration in each of said mixtures.

* * * * *